(12) United States Patent
Nakayama

(10) Patent No.: US 8,778,473 B2
(45) Date of Patent: Jul. 15, 2014

(54) MULTILAYERED RESIN TUBE-SHAPED BODY

(75) Inventor: Hiromi Nakayama, Kuki (JP)

(73) Assignee: Sanoh Industrial Co., Ltd. (JP)

( * ) Notice: Subject to any disclaimer, the term of this patent is extended or adjusted under 35 U.S.C. 154(b) by 28 days.

(21) Appl. No.: 13/576,195

(22) PCT Filed: Jun. 29, 2011

(86) PCT No.: PCT/JP2011/064927
§ 371 (c)(1),
(2), (4) Date: Jul. 31, 2012

(87) PCT Pub. No.: WO2012/002442
PCT Pub. Date: Jan. 5, 2012

(65) Prior Publication Data
US 2012/0298247 A1    Nov. 29, 2012

(30) Foreign Application Priority Data
Jun. 30, 2010  (JP) .................. 2010-148807

(51) Int. Cl.
*B29D 22/00*   (2006.01)
*F16L 9/12*    (2006.01)
*B32B 1/08*    (2006.01)
*B32B 27/32*   (2006.01)
*B32B 27/34*   (2006.01)

(52) U.S. Cl.
CPC . *F16L 9/123* (2013.01); *B32B 1/08* (2013.01); *B32B 27/322* (2013.01); *B32B 27/34* (2013.01)
USPC .................. 428/36.91; 428/36.9; 138/140

(58) Field of Classification Search
CPC ....... F16L 9/123; B32B 1/08; B32B 2597/00; B32B 27/34; B32B 27/322; B32B 2250/24; B32B 2307/724
USPC ............................... 428/36.9, 36.91; 138/140
See application file for complete search history.

(56) References Cited

U.S. PATENT DOCUMENTS

| 5,219,003 | A | * | 6/1993 | Kerschbaumer | 138/137 |
| 5,763,034 | A | * | 6/1998 | Nishino et al. | 428/36.91 |
| 5,869,157 | A | * | 2/1999 | Stoeppelmann | 428/36.91 |
| 6,403,181 | B1 | * | 6/2002 | Barry et al. | 428/36.9 |

(Continued)

FOREIGN PATENT DOCUMENTS

| JP | 05229041 | 9/1993 |
| JP | 06238827 | 8/1994 |

(Continued)

*Primary Examiner* — N. Edwards
(74) *Attorney, Agent, or Firm* — Adams & Wilks

(57) ABSTRACT

Provided is an economical multilayered resin tube-shaped body that can be safely used in a high-temperature environment such as an engine compartment. A multilayered resin tube-shaped body (1) having excellent heat resistance is obtained by fanning an outer layer (2) from a thermoplastic resin having a melting point of 190-300° C. and fonning an inner layer (3) from a thermoplastic resin having a melting point of 150-300° C. and low liquid or gas permeability. The thermoplastic resin that forms the outer layer (2) is preferably a resin having a hoop stress of 10 MPa or greater in a 120° C. atmosphere. Furthermore, the thermoplastic resin that forms the inner layer (3) is preferably a resin having a gasoline permeability of 1.0 g/m²·day or less.

7 Claims, 1 Drawing Sheet

(56) References Cited

U.S. PATENT DOCUMENTS

| | | | |
|---|---|---|---|
| 6,581,643 B2 | 6/2003 | Guippe et al. | 138/137 |
| 7,662,454 B2 * | 2/2010 | Funaki et al. | 428/36.91 |
| 2004/0081787 A1 * | 4/2004 | Nomura et al. | 428/36.91 |
| 2008/0145584 A1 * | 6/2008 | Fish et al. | 428/36.91 |
| 2009/0148641 A1 * | 6/2009 | Uchida et al. | 428/36.91 |
| 2010/0166995 A1 * | 7/2010 | Sato | 428/36.91 |
| 2012/0298247 A1 * | 11/2012 | Nakayama | 138/140 |
| 2013/0295308 A1 * | 11/2013 | Kumazawa et al. | 428/36.9 |

FOREIGN PATENT DOCUMENTS

| | | |
|---|---|---|
| JP | 2001208249 | 8/2001 |
| JP | 2003516501 | 5/2003 |
| JP | 2005065102 | 9/2005 |
| JP | 2006029574 | 2/2006 |
| JP | 2006194434 | 7/2006 |
| JP | 2007030306 | 2/2007 |
| JP | 2007326248 | 12/2007 |
| WO | 2004058833 | 7/2004 |

* cited by examiner

MULTILAYERED RESIN TUBE-SHAPED BODY

CROSS-REFERENCE TO RELATED APPLICATIONS

This application is a U.S. national stage application of International Application No. PCT/JP2011/064927, filed Jun. 29, 2011, claiming a priority date of Jun. 30, 2010, and published in a non-English language.

TECHNICAL FIELD

The present invention relates to a resin tube-shaped body formed into a multilayer structure, and more particularly to a multilayered resin tube-shaped body which is used for pipeline parts such as fuel pipelines of automobiles and attempted to improve heat resistance.

BACKGROUND ART

For fuel pipelines of automobiles, a metallic tube-shaped body had been employed. The surface of the metallic tube-shaped body was covered with plating or a resin in a multiple form to reinforce it in corrosion resistance or chemical resistance.

However, in recent years, as tube-shaped bodies for fuel pipelines, resin tube-shaped bodies have been employed as well as metallic tube-shaped bodies.

Unlike metallic tube-shaped bodies, resin tube-shaped bodies have various advantages such as being resistant to rusting, light in weight, easy in processing and highly flexible in designing. Accordingly, the resin tube-shaped bodies are highly advantageous in automobile field for which low fuel consumption and weight saving have been pursued.

On the other hand, the resin tube-shaped bodies are low in heat resistance as compared with metallic tube-shaped bodies. Therefore, as the mainstream when used for tube-shaped bodies for fuel pipelines, the resin tube-shaped bodies have been used for fuel tank side and the metallic tube-shaped bodies have been used for the inside of engine room as the primary heat source.

However, a demand has recently been increased to use the resin tube-shaped bodies for engine room as well in view of the above-mentioned properties, and for this purpose, improvement of heat resistance is a pressing need, and therefore various proposals have been made.

It has conventionally been known that Polyamide 11, (PA11) (undecanlactam) or Polyamide 12, (PA12) (lauriclactam) is used for the most-outer layer of a resin tube-shaped body. However, both are low in heat resistance and has low reliability in heat resistance in an atmosphere at 100° C. or higher. Accordingly, a method has been employed which covers the resin tube-shaped bodies with a protector made of ethylene/propylene/diene rubber (EPDM). EPDM of this protector is thermosetting and therefore excellent in heat resistance, but it is rubber and therefore poor in lubricating properties with the surface of the resin tube-shaped body when the protector is installed. Accordingly, it has been required to have such a structure that a gap be formed between the protector and the resin tube-shaped body, and it has further been required to take cumbersome treatment of coating the surface of the resin tube-shaped body with a lubricant such as silicone at the time of installation. Further, by the installation of the protector, problems such as increase of weight and cost increase have been caused.

After that, various proposals have been made in order to obtain heat resistant resin tube-shaped bodies without using a protector. The applicant provided in the past the one having heat resistance improved by providing an expandable PET (polyethylene terephthalate) resin layer on the main resin tube-shaped body made of a thermoplastic resin, and then providing an inflammable PET resin layer thereon. (Patent Document 1)

RELATED ART DOCUMENTS

Patent Documents

Patent Document 1:, JP-A-2005-265102

SUMMARY OF THE INVENTION

Problems to be Solved by the Invention

In the present invention, it is intended to obtain a multilayered resin tube-shaped body with a structure different from the Patent Document 1,, by which the heat resistance is further improved, and therefore to obtain economically ones that can be used safely even in a high temperature atmosphere inside an engine room.

Means of Solving the Problems

The present invention provides a resin tube-shaped body having a multilayered structure formed by plural resin layers. In the multilayered structure, an outer layer is made of a thermoplastic resin having a melting point of 190, to 300° C., and an inner layer is made of a thermoplastic resin which has a melting point of 150, to 300° C. and is low in permeability to liquid or vapor. By this structure, it is possible to obtain a resin tube-shaped body having excellent heat resistance.

As the thermoplastic resin forming the outer layer, it is preferred to use ones having a hoop stress of 10, MPa or higher in an atmosphere at 120° C. Further, as the thermoplastic resin forming the inner layer, it is preferred to use ones having a gasoline permeability of 1.0, $g/m^2 \cdot day$ or lower.

The above inner layer may be a single layer or may be formed into plural layers by combining thermoplastic resins of different types.

As the thermoplastic resin forming the outer layer, a polyamide resin selected from Polyamide 612, (PA612) (hexamethylene diamine+dodecandioic acid), Polyamide 6 (PA6) (ε-caprolactam) and Polyamide 66, (PA66) (hexamethylene diamine+adipicacid) may preferably be used.

Further, the inner layer is formed with a layer of at least one thermoplastic resin selected from Polyamide 9T (PA9T) (nonandiamine+terephthalic acid), Polyamide 6T (PA6T) (hexamethylene diamine+terephthalic acid), polyphenylene sulfide (PPS), ethylene vinyl alcohol (EVOH), polybutylene naphthalate (PBN), ethylene tetrafluoro ethylene (ETFE) and liquid crystalline polymer (LCP).

The outer layer may preferably be formed to have a thickness of at least a half or more of the entire thickness of the multilayered resin tube-shaped body.

Effects of the Invention

According to the present invention, it is possible to secure sufficient heat resistance and high strength in pressure resistance even in a high temperature atmosphere of 120, to 150° C. while thermoplastic resins are used as the materials for the outer layer and inner layer of the multilayered resin tube-shaped body. It is also possible to obtain a multilayered resin tube-shaped body having a repetitive fatigue property (Pulsation resistance) remarkably improved.

By this structure, the multilayered resin tube-shaped body can be used at a high temperature site such as an engine room, by which weight saving of pipeline parts can be realized and production thereof can be made economically.

MODE FOR CARRYING OUT THE INVENTION

Figure 1:
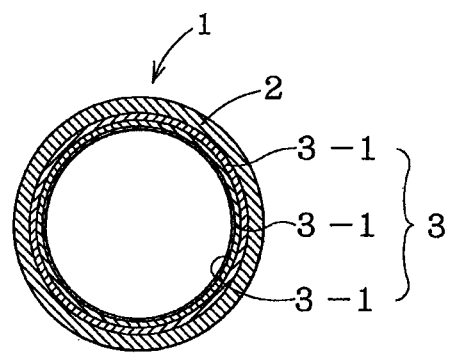
FIG. 1 is a sectional view of a multilayered resin tube-shaped body showing an example of the present invention.

The outer layer (2) of the multilayered resin tube-shaped body (1) of the present invention is formed with a thermoplastic resin having a melting point of 190, to 300° C.

Further, the thermoplastic resin used for the outer layer (2) is preferably the one having a hoop stress of 10, MPa or higher in an atmosphere at 120° C.

As such thermoplastic resin, a polyamide resin may be mentioned, for example, Polyamide 612, (PA612), Polyamide 6 (PA6) and Polyamide 66, (PA66) may be mentioned.

The inner layer (3) located at the inside of the outer layer (2) is also formed with a thermoplastic resin. This thermoplastic resin shows a melting point of 150, to 300° C., and the one having a low permeability to a liquid such as gasoline, alcohol-containing gasoline or light oil, a vapor of such liquid, or a vapor such as propane gas or natural gas.

As the degree of the low permeability, for example, the one having a permeability of 1.0, g/m$^2$·day or lower to gasoline.

As the thermoplastic resin forming the inner layer (3), for example, Polyamide 9T (PA9T), Polyamide 6T (PA6T), polyphenylene sulfide (PPS), ethylene vinyl alcohol (EVOH), polybutylene naphthalate (PBN), ethylene tetrafluoro ethylene (ETFE), a liquid crystalline polymer (LCP), etc. may be used.

The inner layer (3) may be formed into a single layer of the thermoplastic resin, or may be formed into plural layers of at least two layers. When the inner layer (3) is formed into plural layers, the above thermoplastic resins may be combined for the plural layers depending on the type of the liquid or vapor which run through the tube-shaped body.

It is usually preferred to form the above outer layer (2) and the inner layer (3) adjacent to each other. When these are formed adjacent to each other, it is recommendable to form a chemical bonding state containing imide bond by, for example, conducting the bonding in a molten state between the thermoplastic resin forming the outer layer and the thermoplastic resin forming the inner layer.

It is preferred that such chemical bonding state between the outer layer (2) and the inner layer (3) is also formed between multiply formed inner layers e.g. (3-1), (3-2) and (3-3).

Between the outer layer (2) and the inner layer (3), if necessary, a layer such as an adhesive layer may be interposed. Further, if necessary, a layer such as an adhesive layer may be interposed between plural layers forming the inner layer (3). Furthermore, if necessary, a layer may further be provided at the outside of the outer layer (2).

As mentioned above, the outer layer (2) and the inner layer (3) are indicated to show the relative positional relationship, and it is not necessarily meant that both are brought into direct contact with each other. Further, it is not meant that the outer layer (2) is the outer-most layer of the multilayered resin tube-shaped body (1).

If the outer layer (2) is formed so that its thickness accounts for at least a half or more of the entire thickness of the multilayered resin tube-shaped body (1), excellent heat resistance can be obtained.

Since the multilayered resin tube-shaped body (1) is formed with a thermoplastic resin, this can be produced by a method such as extrusion molding and economical production thereof can be made.

When this multilayered resin tube-shaped body is used in the engine room of automobile, it can resist to a temperature of 120, to 150° C. As the performance required for such multilayered resin tube-shaped body, it is preferred to have a hoop stress of 3.0, MPa or higher in an atmosphere at 120° C.

The multilayered resin tube-shaped body (1) may be subjected to a secondary processing treatment, for example, bending of 10° or higher, and may be processed in a three-dimensional shape as pipeline parts of an automobile.

And, if a connector (not shown) is attached to the terminal end of this multilayered resin tube-shaped body (1), this body can easily be connected to other resin tube-shaped body or a metallic tube-shaped body, and can be advantageously used as pipeline parts of an automobile.

The connector is often formed by molding of the thermoplastic resin. If the connector is made from a heat-resistant plastic with standing under an atmosphere of 120° C. or higher, the heat resistance as the pipeline parts of an automobile can entirely be improved and these can be used safely.

EXAMPLES

Example 1

A multilayered resin tube-shaped body (1) having an outer diameter of 8, mm and an inner diameter of 6, mm was prepared by extrusion molding, in which an outer layer (outer-most layer) (2) having a thickness of 0.8, mm was formed from PA612, and adjacent to the outer layer, an inner layer (3-1) having a thickness of 0.2, mm was formed from PA9T.

Example 2

A multilayered resin tube-shaped body (1) having the same outer diameter and inner diameter as in Example 1, was prepared by extrusion molding, in which an outer layer (outer-most layer) (2) having a thickness of 0.7, mm was formed from PA612, and adjacent to the outer layer, an inner layer-1 (3-1) having a thickness of 0.2, mm was formed from PA9T, and further, at its inner side, an inner layer-2 (3-2) having a thickness of 0.1 mm was formed from ETFE.

Example 3

A multilayered resin tube-shaped body (1) having the same outer diameter and inner diameter as in Example 1, was prepared by extrusion molding, in which an outer layer (outer-most layer) (2) having a thickness of 0.7, mm was formed from PA612, and adjacent to the outer layer, an inner layer-1 (3-1) having a thickness of 0.3, mm was formed from PA6T.

Example 4

A multilayered resin tube-shaped body (1) having the same outer diameter and inner diameter as in Example 1, was prepared by extrusion molding, in which an outer layer (outer-most layer) (2) having a thickness of 0.6, mm was formed from PA612, and adjacent to the outer layer, an inner layer-1 (3-1) having a thickness of 0.3, mm was formed from PA6T, and further, at its inner side, an inner layer-2 (3-2) having a thickness of 0.1 mm was formed from ETFE.

Example 5

A multilayered resin tube-shaped body (1) having the same outer diameter and inner diameter as in Example 1, was prepared by extrusion molding, in which an outer layer (outer-most layer) (2) having a thickness of 0.8, mm was formed from PA612, and adjacent to the outer layer, an inner layer-1 (3-1) having a thickness of 0.2, mm was formed from ETFE.

Example 6

A multilayered resin tube-shaped body (1) having the same outer diameter and inner diameter as in Example 1, was prepared by extrusion molding, in which an outer layer (outer-most layer) (2) having a thickness of 0.5, mm was formed from PA612, and adjacent to the outer layer, an inner layer-1 (3-1) having a thickness of 0.2, mm was formed from PA9T, and at its inner side, an inner layer-2 (3-2) having a thickness of 0.2, mm was formed from EVOH, and further, at its inner side, an inner layer-3 (3-3) having a thickness of 0.1, mm was formed from ETFE.

Example 7

A multilayered resin tube-shaped body (1) having the same outer diameter and inner diameter as in Example 1, was prepared by extrusion molding, in which an outer layer (outer-most layer) (2) having a thickness of 0.7, mm was formed from PA6, and adjacent to the outer layer, an inner layer-1 (3-1) having a thickness of 0.3, mm was formed from PA9T.

Examples 8, to 12

Using the compositions indicated in Table 2,, multilayered resin tube-shaped bodies were prepared in EXAMPLE 8, in the same manner as in EXAMPLE 4,, in EXAMPLE 9, as in EXAMPLE 3,, in EXAMPLE 10, as in EXAMPLE 4,, in EXAMPLE 11, as in EXAMPLE 3,, and in EXAMPLE 12, as in EXAMPLE 6.

Tests

The following tests were conducted to examine the properties of the multilayered resin tube-shaped bodies prepared in the above examples.

Repetitive Stress Evaluation Test

Materials Subjected To Test

1. Multilayered resin tube-shaped bodies of EXAMPLES 1, 2, and 5
2. Structure of a multilayered resin tube-shaped body of COMPARATIVE EXAMPLE 1

A multilayered resin tube-shaped body (1) having the same outer diameter and inner diameter as in Example 1, was prepared by extrusion molding, in which an outer layer (outer-most layer) (2) having a thickness of 0.7, mm was formed from PA11, and adjacent to the outer layer, an inner layer-1 (3-1) having a thickness of 0.1, mm was formed from a modified ETFE (m-ETFE), and further, at its inner side, an inner layer-2 (3-2) having a thickness of 0.2, mm was formed from ETFE.

Test Conditions and Methods

1. Test Temperature Condition:

Test materials were kept at −40° C. for 50, minutes, and the temperature was raised from −40° C. to 120° C. over 50, minutes, and then the materials were kept at 120° C. for 50, minutes, and further the temperature was returned from 120° C. to −40° C. over 50, minutes. This operation constitutes one cycle, and this cycle was repeated.

2. Pressure Amplitude Condition:

Pressure was raised from 0, MPa to 1, MPa over 5, seconds, and kept at 1, MPa for 10, seconds, then reduced from 1, MPa to 0, MPa over 5, seconds, and further kept at 0, MPa for 10, seconds. This operation constitutes one cycle (1, time) consists of, and this cycle was repeated.

3. Materials and Methods for Pressure Amplitude:

(1) Fuel C (pseudo-fuel obtained by mixing isooctane and toluene fifty-fifty) was circulated through the multilayered resin tube-shaped body as the material subjected to the test by a fuel pump for an automobile to undergo the above pressure amplitude test.

(2) Using a pseudo-fuel obtained by mixing 15, vol % of the above Fuel C and 85, vol % of ethanol, the pseudo-fuel was circulated through the multilayered resin tube-shaped body as the material subjected to the test by a fuel pump for an automobile to undergo the above pressure amplitude test in the same manner as in the above (1).

4. Test Conditions:

The above pressure amplitude condition was conducted at most 100,000, times (cycles).

Evaluation Method of Test

1. Maximum amplitude number until the multilayered resin tube-shaped body as the test material ruptures is measured.

Test Results 1. The results of test using Fuel C are indicated in Table 3.

2. The results of test using the mixture of 15, vol % of Fuel C and 85, vol % of ethanol are indicated in Table 4.

Hoop Stress Evaluation Test

Materials Subjected to Test

1. Multilayered resin tube-shaped body of EXAMPLE 2
2. Structures of multilayered resin tube-shaped bodies of COMPARATIVE EXAMPLES 1, 2, and 3

(1) Comparative Example 1

The same as the above.

(2) Comparative Example 2

A multilayered resin tube-shaped body (1) having an outer diameter of 8, mm and an inner diameter of 6, mm was prepared by extrusion molding, in which an outer layer (2) having a thickness of 0.7, mm was formed from PA11, and adjacent to the outer layer, an inner layer-1 (3-1) having a thickness of 0.1, mm was formed from an alloy of PA and PPS (PA/PPS alloy), and further at its inner side, an inner layer-2 (3-2) having a thickness of 0.2, mm was formed from PPS.

(3) Comparative Example 3

A multilayered resin tube-shaped body (1) having an outer diameter of 8, mm and an inner diameter of 6, mm was prepared by extrusion molding, in which an outer layer (2) having a thickness of 0.8, mm was formed from PA12, and adjacent to the outer layer, an inner layer (3) having a thickness of 0.2, mm was formed from ETFE.

Test Conditions and Methods
1. Environment of test: In an atmosphere of 23° C.
2. Test Method:
A pseudo-fuel was injected under pressure into a multilayered resin tube-shaped body as the test material, and pressurized by increasing the pressure by 1, MPa per 5, seconds, and the rupture strength (MPa) when the test material ruptures is measured.

Based on the measured rupture strength (MPa), hoop stress was determined by the following formula:

Hoop stress (MPa)=Rupture strength (MPa)×{(outer diameter−inner diameter)/20}×Thickness of tube Evaluation Method of Test
As a property demanded for a multilayered resin tube-shaped body, it is required to have a hoop stress of 25.0 MPa or higher in a 23° C. atmosphere to have a hoop stress necessary for showing rupture-resistant property of 3.0, MPa or higher in a 120° C. atmosphere.

Figure 2:
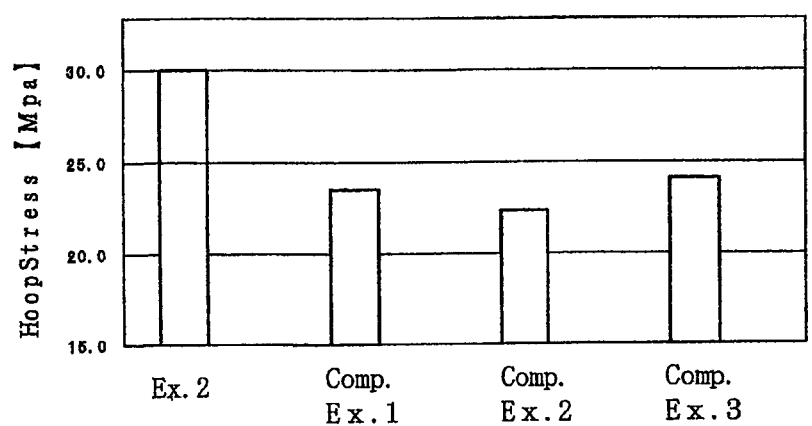
FIG. 2 is a bar graph showing the hoop stress for each of EXAMPLE 2, and COMPARATIVE EXAMPLES 1, 2, and 3.

Test Results
The hoop stress test results for EXAMPLE 2, and COMPARATIVE EXAMPLES 1, 2, and 3, are illustrated in the bar graph of FIG. 2.

Consideration
In the repetitive stress evaluation tests, the tube-shaped body of COMPARATIVE EXAMPLE 1, ruptured at 37,000 times when Fuel C was used and at 14,000, times when the mixture of 15, vol % of Fuel C and 85, vol % of ethanol was used. On the other hand, regarding the ones of EXAMPLES 1, to 3,, no rupture was seen even at 100,000, times and excellent result was shown.

Further, in the evaluation test of hoop stress, the one of EXAMPLE 2, showed excellent numerical value of 30, MPa which exceeds 25, MPa. However, regarding the ones of COMPARATIVE EXAMPLES 1, to 3,, the values were at the level of 22, to 24, MPa which are less than 25.0, MPa.

TABLE 1

|  | Ex. 1 | Ex. 2 | Ex. 3 | Ex. 4 | Ex. 5 | Ex. 6 |
|---|---|---|---|---|---|---|
| Outer layer | PA612 | PA612 | PA612 | PA612 | PA612 | PA612 |
| Inner layer-1 | PA9T | PA9T | PA6T | PA6T | ETFE | PA9T |
| Inner layer-2 |  | ETFE |  | ETFE |  | EVOH |
| Inner layer-3 |  |  |  |  |  | ETFE |

TABLE 2

|  | Ex. 7 | Ex. 8 | Ex. 9 | Ex. 10 | Ex. 11 | Ex. 12 |
|---|---|---|---|---|---|---|
| Outer layer | PA6 | PA6 | PA6 | PA6 | PA6 | PA6 |
| Inner layer-1 | PA9T | PA9T | PA6T | PA6T | ETFE | PA9T |
| Inner layer-2 |  | ETFE |  | ETFE |  | EVOH |
| Inner layer-3 |  |  |  |  |  | ETFE |

TABLE 3

|  | Maximum amplitude number |
|---|---|
| Ex. 1 | No rupture at 100,000 times |
| Ex. 2 | No rupture at 100,000 times |
| Ex. 5 | No rupture at 100,000 times |
| Comp. Ex. 1 | Ruptured at 37,000 times |

TABLE 4

|  | Maximum amplitude number |
|---|---|
| Ex. 1 | No rupture at 100,000 times |
| Ex. 2 | No rupture at 100,000 times |
| Ex. 5 | No rupture at 100,000 times |
| Comp. Ex. 1 | Ruptured at 14,000 times |

The invention claimed is:

1. A multilayered resin tube-shaped body having a multilayered structure with plural resin layers, comprising:
an outer layer made of a thermoplastic resin having a melting point of 190 to 300° C., and a hoop stress of 10 MPa or higher in an atmosphere at 120° C.; and
an inner layer made of a thermoplastic resin having a melting point of 150 to 300° C., and a gasoline permeability of 1.0 g/m²·day or lower.

2. A multilayered resin tube-shaped body having a multilayered structure with plural resin layers, comprising:
an outer layer made of a thermoplastic resin having a melting point of 190 to 300° C.; and
an inner layer made of a thermoplastic resin having a melting point of 150 to 300° C.,
wherein the thermoplastic resin forming the outer layer has a hoop stress of 10 MPa or higher in an atmosphere at 120° C., the thermoplastic resin forming the inner layer has a gasoline permeability of 1.0 g/m²·day or lower, and the inner layer is formed into plural layers from thermoplastic resins of different types.

3. The multilayered resin tube-shaped body according to claim 2, wherein the thermoplastic resin forming the outer layer is a polyamide resin selected from Polyamide 612, Polyamide 6 and Polyamide 66.

4. A multilayered resin tube-shaped body having a multilayered structure with plural resin layers, comprising:
an outer layer made of a thermoplastic resin having a melting point of 190 to 300° C.; and
an inner layer made of a thermoplastic resin having a melting point of 150 to 300° C.,
wherein the thermoplastic resin forming the outer layer has a hoop stress of 10 MPa or higher in an atmosphere at 120° C., the thermoplastic resin forming the inner layer has a gasoline permeability of 1.0 g/m²·day or lower, and the inner layer is formed into plural layers from thermoplastic resins of different types;
wherein the inner layer is formed into plural layers from thermoplastic resins selected from Polyamide 9T, Polyamide 6T, polyphenylene sulfide (PPS), ethylene vinyl alcohol (EVOH), polybutylene naphthalate (PBN), ethylene tetrafluoro ethylene (ETFE) and a liquid crystalline polymer (LCP);
wherein the thermoplastic resin forming the outer layer is a polyamide resin selected from Polyamide 612, Polyamide 6 and Polyamide 66; and
wherein a chemical bonding state containing imide bond is formed between the thermoplastic resin forming the outer layer and the thermoplastic resin forming the inner layer, and between the plural layers forming the inner layer.

5. The multilayered resin tube-shaped body according to claim 4, wherein the outer layer has a thickness which accounts for at least a half or more of the entire thickness of the resin tube-shaped body.

6. A multilayered resin tube-shaped body having a multilayered structure with plural resin layers, comprising:
 an outer layer made of a thermoplastic resin having a melting point of 190 to 300° C.; and
 an inner layer made of a thermoplastic resin having a melting point of 150 to 300° C., wherein
 the thermoplastic resin forming the outer layer has a hoop stress of 10 MPa or higher in an atmosphere at 120° C., the thermoplastic resin forming the inner layer has a gasoline permeability of 1.0 g/m²·day or lower, and the thermoplastic resin forming the outer layer is a polyamide resin selected from Polyamide 612, Polyamide 6 and Polyamide 66;
 the inner layer is formed into plural layers from thermoplastic resins of different types selected from Polyamide 9T, Polyamide 6T, polyphenylene sulfide (PPS), ethylene vinyl alcohol (EVOH), polybutylene naphthalate (PBN), ethylene tetrafluoro ethylene (ETFE) and a liquid crystalline polymer (LCP);
 a chemical bonding state containing imide bond is formed between the thermoplastic resin forming the outer layer and the thermoplastic resin forming the inner layer, and between the plural layers forming the inner layer;
 the outer layer has a thickness which accounts for at least a half or more of the entire thickness of the resin tube-shaped body;
 a part of the resin tube-shaped body has a portion subjected to a bending processing of 10° or higher; and
 at least one terminal end of the resin tube-shaped body is provided with a connector to be connected to another metallic tube-shaped body or resin tube-shaped body.

7. The multilayered resin tube-shaped body according to claim 6, wherein the connector has a heat-resistance which can withstand an atmosphere at 120° C. or higher.

* * * * *